United States Patent [19]

Schwirzke

[11] 4,394,579
[45] Jul. 19, 1983

[54] LASER INDUCED PLASMA PRODUCTION FOR ISOTOPE SEPARATION

[76] Inventor: Fred R. Schwirzke, 1591 Josselyn Canyon Rd., Monterey, Calif. 93940

[21] Appl. No.: 86,982

[22] Filed: Oct. 22, 1979

[51] Int. Cl.³ .............................................. B01D 59/00
[52] U.S. Cl. ................................................ 250/423 P
[58] Field of Search .............. 250/423 P; 204/157.1 R

[56] References Cited

U.S. PATENT DOCUMENTS

| | | | |
|---|---|---|---|
| 3,772,519 | 11/1973 | Levy et al. | 250/423 P X |
| 3,987,302 | 10/1976 | Hurst et al. | 250/283 |
| 4,000,420 | 12/1976 | Harris | 250/423 P X |
| 4,070,580 | 1/1978 | Gallagher et al. | 250/423 P |
| 4,090,856 | 5/1978 | Rogoff | 250/423 P X |
| 4,110,182 | 8/1978 | Stevens | 204/157.1 R |
| 4,158,139 | 6/1979 | Rostler | 250/423 P |

Primary Examiner—Deborah L. Kyle
Attorney, Agent, or Firm—R. S. Sciascia; Charles D. B. Curry; George L. Craig

[57] ABSTRACT

In a system for isotope enrichment, a method and apparatus for separating atoms of one isotope type from an environment containing plural isotope types. Tunable lasers or laser systems are used to selectively pump atoms of the desired isotope to a metastable excited state several eV above the isotope atom ground state. A reduced ionization energy is then supplied to atoms of the metastable isotopes taking advantage of the longer lifetimes achieved. The resulting plasma created by ionizing atoms of the isotope in the metastable state is subjected to electromagnetic fields to separate atoms of the desired isotope.

17 Claims, 5 Drawing Figures

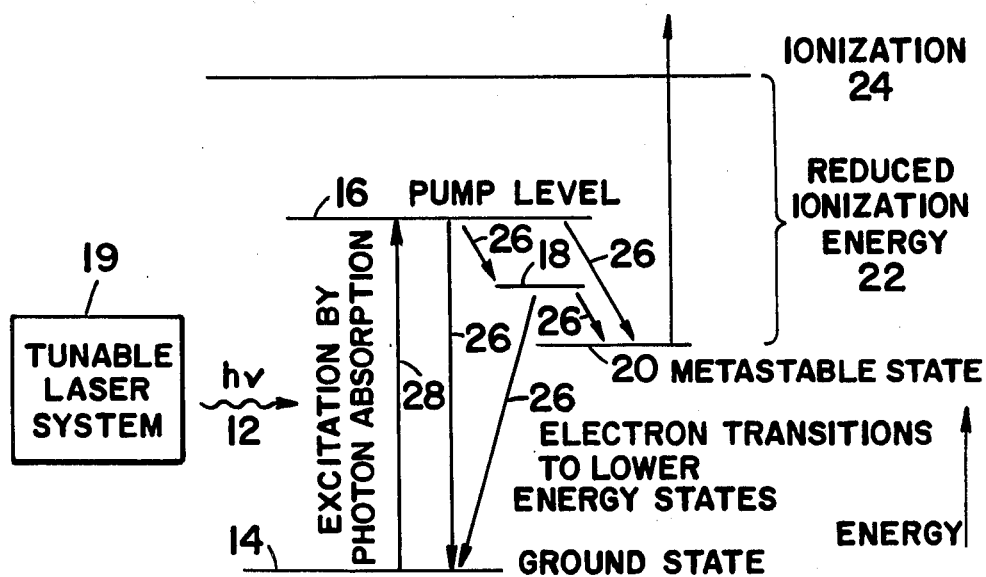
FIG_1
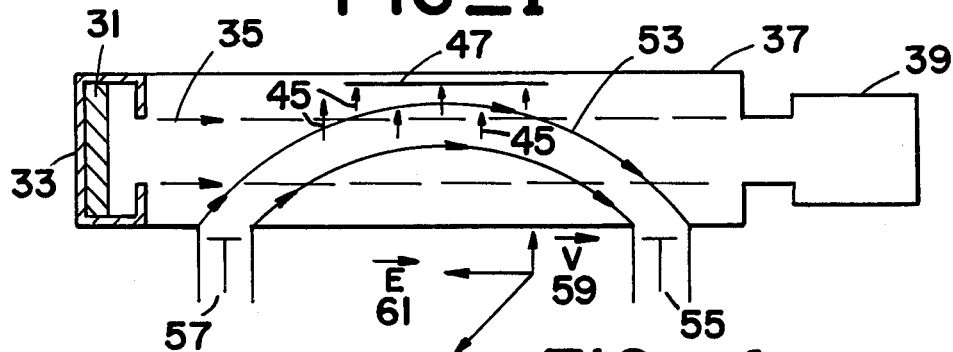
FIG_4
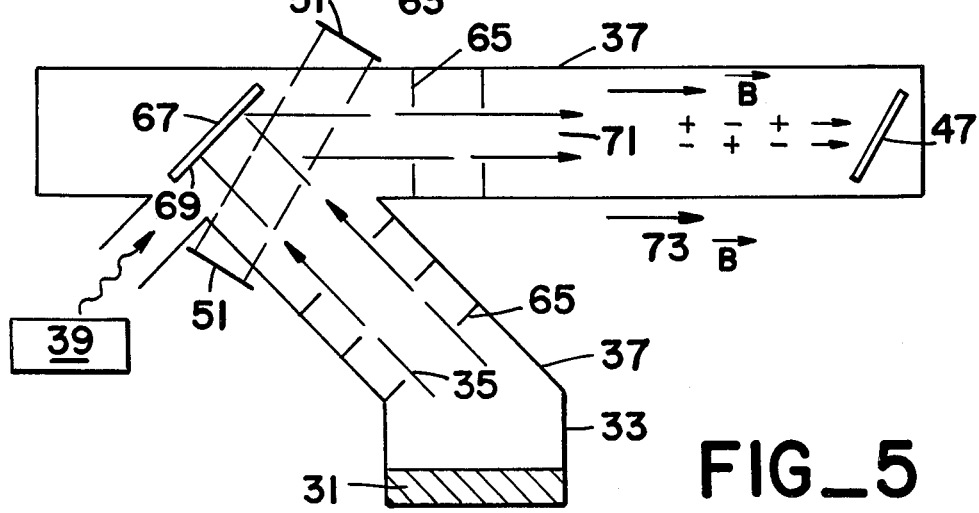
FIG_5

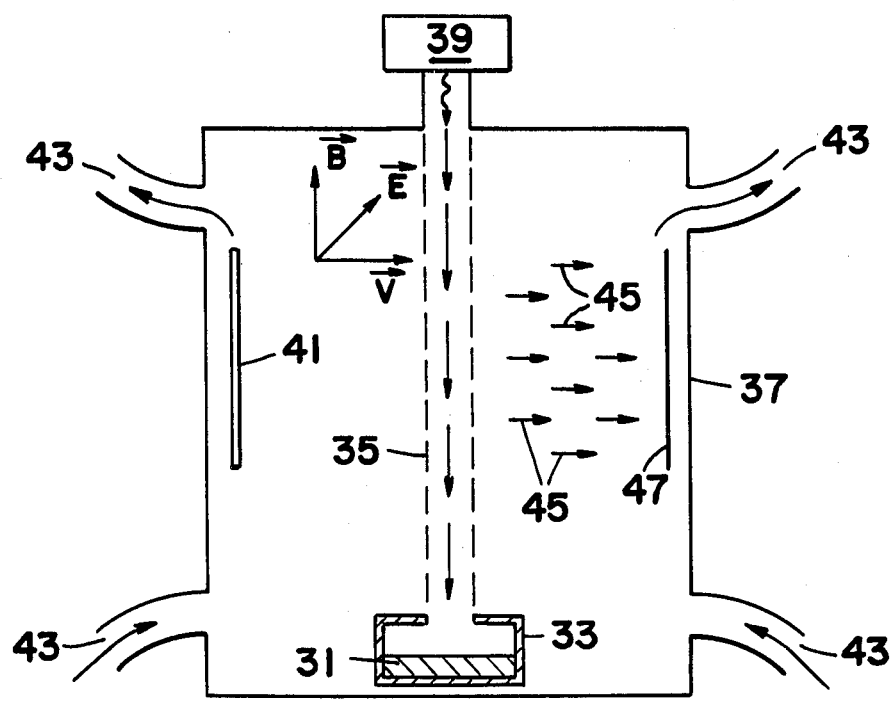
FIG_2
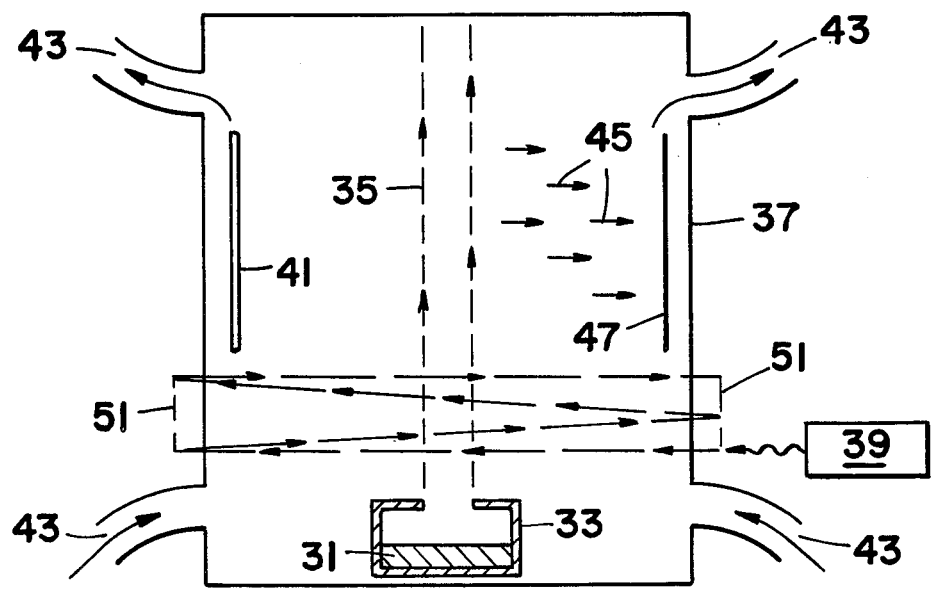
FIG_3

4,394,579

LASER INDUCED PLASMA PRODUCTION FOR ISOTOPE SEPARATION

BACKGROUND OF THE INVENTION

1. Field of the Invention

This invention relates to isotope separation. More particularly, the invention relates to isotope separation using a laser or laser system to initially pump a selected isotope to an excited state of long life time (metastable state) and then supplying a continuous source of reduced ionization energy to form a plasma of the isotope. The selected isotope plasma may then be separated from the isotope in the neutral state by applying external electromagnetic fields.

2. Description of Prior Art

Uranium enriched with the isotope $^{235}U$ is increasingly needed as fuel for nuclear reactors. Two enrichment methods are predominantly used. The slight mass differences of $^{235}U$ from $^{238}U$ are used by the gaseous diffusion and centrifuge methods. Enrichment by these methods generally require cascaded processing using a sequence of many stages in series, each stage providing only a slight increase in the concentration of the desired isotope due to the small separation factor per separating unit at each stage.

Another method is one of photo-ionization in which the atoms of the desired isotope are excited by one source of radiant energy and the excited isotope atoms are then ionized by a second source of radiant energy. The two radiant energy sources are generally tunable lasers. The desired ions are then removed by application of electromagnetic fields. The drawbacks of this method are the small cross-section for photo-ionization and the extremely short lifetimes of the isotopes in the excited state. The short lifetime requires application of powerful pulses of exciting and ionizing radiation at different wavelengths.

A promising new technique for efficient production of enriched uranium isotopes operates by first exposing a vapor of uranium to a laser radiation source to excite a specific isotope to an excited state above the ground state. In cascading down to lower energy states many electrons will be trapped in long-life metastable states. By intense pumping with laser radiation a large fraction of the selected isotope will accumulate in a metastable state. Several alternative embodiments are described in which a continuous or pulsed source of 'reduced ionization energy' is imparted to the specific isotope in the excited and metastable state to create an ion plasma of the specific isotope. The nature of the ionization source avoids the problems listed above and makes maximal use of those isotopes in the metastable excited state having much longer lifetimes. Electromagnetic forces are then applied to separate the ion plasma from the neutral vapor. The 'reduced ionization energy' supplied is described by the equation:

$$\xi_i^* \geq \xi_i - \xi^*$$

where $\xi_i^*$ is the reduced ionization energy $\xi_i$ is the ionization energy necessary to ionize the atom from the ground state.

$\xi^*$ is the energy of the isotope in the excited state which depends on the laser photon energy $h\nu$.

$\xi^* < h\nu$ when the electron of the excited isotope is trapped in a metastable state below the pump level.

SUMMARY OF THE INVENTION

The invention is briefly summarized as a new apparatus and method for isotope enrichment in which atoms of one desired isotope type are separated from an environment containing plural isotope types. Tunable lasers or laser systems are used to selectively excite the desired isotope to excited and metastable excited states above the isotope ground state. A continuous source of 'reduced ionization energy' is then supplied to the excited and metastable excited isotopes taking advantage of the longer lifetimes achieved. The resulting plasma created by the ionized isotopes is subjected to electromagnetic fields to separate the desired isotope.

A first object of invention is to provide an apparatus and method for isotope separation using a laser or laser system only to pump selected isotopes into an excited and metastable state.

A second object of invention is to provide an apparatus and method for isotope separation using a continuous or pulsed source of ionization energy to form an ionized plasma from the isotope in the excited and metastable state.

With this new method the longer lifetimes of those isotopes in the metastable excited state are fully utilized.

BRIEF DESCRIPTION OF THE DRAWINGS

FIG. 1 shows a schematic energy level diagram representing the method for pumping atoms of the desired isotope into the metastable state.

FIG. 2 shows a cross-section view of one embodiment of the thermal ionization method.

FIG. 3 shows a cross-section view of a second embodiment of the thermal ionization method.

FIG. 4 shows a cross-section view of the laser sustained discharge method.

FIG. 5 shows a cross-section view of the surface contact ionization method.

DESCRIPTION OF THE PREFERRED EMBODIMENT

The following description of the invention specifically applies to the enrichment of the uranium isotope $U^{235}$. The disclosed invention can be used, very generally, also to the enrichment of isotopes of other elements.

In describing the invention for uranium isotope enrichment reference is made to FIG. 1. A tunable laser system 19 emits photons $h\nu$ 12 of narrow bandwidth which are selectively absorbed 28 by the atoms of the isotope $U^{235}$ to excite these atoms from the ground state 14 to a pump level 16.

Electrons excited into the pump level 16 rapidly (within $10^{-8}$ sec) make transitions 26 into lower energy states 18 of short lifetime of approximately $10^{-8}$ sec and also back to the ground state 14. Depending on the transition probabilities a fraction of the electrons will be trapped in metastable states 20 which have a long lifetime of approximately $10^{-3}$ sec. By intense pumping with laser radiation a large fraction of the selected isotope will accumulate in the metastable state 20.

To create an electron-ion plasma from atoms of the specific isotope *$U^{235}$ in the metastable state 20 requires further energy transfer in the amount of the 'reduced ionization' energy 22. This 'reduced ionization energy' brings the electron from the excited, metastable state 20 into the free electron continuum above the ionization limit 24.

For alternative embodiments imparting the reduced ionization energy to atoms of the specific isotope causing transitions to the excited and metastable state are described.

Referring to a first embodiment shown in FIG. 2, a mass of uranium metal 31 is placed in an oven 33 and heated to produce a uranium vapor beam 35 inside a vacuum vessel 37. A tunable laser 39 is directed along and opposite to the uranium vapor beam 35 and selectively excites atoms of the isotope of U$^{235}$ to excited and metastable excited states approximately 1 eV or more above the ground state. The excited and metastable excited atoms of the isotope of U$^{235}$ are then thermally ionized by supplying thermal energy by means of either a heating grid 41 or by mixing an injected heated inactive gas 43, helium for example, with the uranium vapor beam 35 or both. The thermally ionized atoms of the isotope form a plasma 45 that can be moved toward a collector plate 47 by application of external electric and/or magnetic fields.

A second embodiment, incorporating all of the structural features of the embodiment shown in FIG. 2, is shown in FIG. 3 where the laser 39 is directed across the uranium vapor beam 35 a number of times by means of apertures 49 in the vacuum vessel 37 and a series of mirrors 51 aligned behind the apertures.

The ionization of the excited and metastable excited isotopes can be achieved at a lower temperature than is required for atoms in the ground state. From Saha's equation for a gas in thermal equilibrium, it follows that the degree of ionization is proportional to $e^{-\xi_i/kt}$ where k is the Boltzmann constant. Hence for the two isotopes of different effective ionization potential, U$^{235}$ and U$^{238}$, the ratio of degrees of ionization becomes $$\frac{\eta_{i1}}{\eta^*_{o1}} \frac{\eta_{o2}}{\eta_{i2}} \propto \frac{e^{-\xi^*_i/kT}}{e^{-\xi_i/kT}} = e^{(\xi_i - \xi^*_i)/kT} = e^{\xi^*/kT} \leq e^{h\nu/kT}$$

where $\eta^*_{o1}$ = particle density of the excited isotope, U$^{235}$
$\eta_{i1}$ = ion density of +U$^{238}$
$\eta_{o2}$ = particle density of the non-excited isotopes Clearly, the exponential factor will have a large influence on the ratio of the degrees of ionization. Further, the temperature dependency causes the degree of ionization of the excited and metastable excited isotopes to vary considerably over a relatively narrow temperature range. Therefore selective ionization is achieved by proper choice of a suitable temperature and laser frequency. Depending on vapor pressure and laser intensity, a ±U$^{235}$ plasma of $10^{11}$ to $10^-$ions/cm$^3$ can be obtained. Recombination and charge exchange by the ions will interfere with the separation process by the applied electromagnetic fields. However, after recombination, the selected isotopes will be preferentially excited and ionized repeatedly as long as the laser is pumping the isotopes into the metastable state. As a consequence, depending on charge exchange and recombination cross-sections, a larger fraction of the desired isotope will be in the plasma state compaed to those in the neutral gas state, i.e., $$\frac{\eta_{i1}}{\eta_{i2}} > \frac{\eta_{o1}}{\eta_{o2}}$$

The reduced ionization energy may be supplied by a third embodiment shown in FIG. 4. A mass of uranium metal 31 is heated in an oven 33 to produce a uranium vapor beam 35 in a vacuum vessel 37. A tunable laser 39 is directed into the uranium vapor beam 35 to selectively pump atoms of the desired isotope of U$^{235}$ in the uranium vapor beam 35 to excited and metastable excited states approximately 1 eV or more above the ground state. The 'reduced ionization energy' is then supplied to the excited and metastable excited atoms of the isotope by means of electrons 53 from a discharge generated between an anode 55 and a cathode 57 within the vacuum vessel 37. The ionized atoms of the isotope then form a plasma 45 which is removed by electric and/or magnetic forces from the neutral beam and collected on a collector plate 47 within the vacuum vessel 37. In this method, the laser excited and metastable excited atoms of the U$^{235}$ isotope are preferentially ionized by collisions with discharge electrons 53. The degree of ionization in such a discharge is $10^{-2}$ to $10^{-4}$ depending on the electron temperature and applied current. By adjusting the parameters of vapor pressure and applied voltage, the discharge may be sustained only concurrent with laser excitation of atoms of the selected isotope. As before, with laser pumping a larger fraction of atoms of the desired isotope will be in the plasma state compared to those in the neutral gas state. Unless compensation is made, excessive electron temperature may cause excitation of atoms of the undesired isotope. Therefore, other gases may be injected into the vacuum vessel to control the electron temperature. Further, the laser may operate in a continuous or pulsed mode of operation. Separation of the plasma from the neutral vapor can be achieved in this method by a drift motion of the plasma with a velocity v59

$\vec{V} = \vec{E} \times \vec{B}/B^2$ due to the discharge electric field $\vec{E}$61 and a perpendicularly applied magnetic induction field $\vec{B}$63.

A fourth embodiment supplying the reduced ionization energy is via surface contact ionization shown in FIG. 5. The work functions of rhenium and tungsten are sufficiently high to produce a plasma from uranium vapor in contact with heated surfaces of these metals. If atoms of the desired isotope are selectively pumped by laser radiation the excited atoms in a metastable state can be ionized by materials of lower work functions and at a lower temperature. Referring to FIG. 5, uranium metal 31 is heated in an oven 33 to produce an uranium vapor atomic-beam 35 in a vacuum vessel 37. Apertures 65 can be used to define the cross-section of the beam. A tunable laser 39 is directed to the uranium atomic-beam 35 by multiple reflections from mirrors 51 to selectively pump atoms of the desired isotope U$^{235}$ into an excited and metastable state. This method of pumping atoms of the desired isotope into a metastable state with a long lifetime of about $10^{-3}$ sec has the enormous advantage that the beam atoms coming from the oven 33 with a thermal velocity of about $3 \times 10^4$ cm/sec can be illuminated with the laser and transported over a distance of $(3 \times 10^4$ cm/sec$)\times (10^{-3}$ sec$) = 30$ cm until they reach the hot surface of a heated plate 67 for contact ionization 69. By chosing a high enough temperature, electrons are also emitted from the heated surface to form a +U$^{235}$-ion-electron plasma 71. This generation of a plasma at the surface 69 is important because space charge effects would tend to interfere with the separation process by electric and/or magnetic fields.

A homogenous or inhomogeneous magnetic field B, 73, can be used to separate the plasma 71 from the neutral vapor. The magnetic field $\vec{B}73$ confines the $+U^{235}$—plasma into a beam which can thus be guided along magnetic field lines to a cold collector plate 47.

The new method of using only a single tunable laser to pump atoms of a selected isotope to excited metastable states and creating an ion plasma of atoms of the selected isotope by continuous electron collisions in a discharge, or continuous contact ionization on a hot surface offers several distinct improvements over prior art. Multiple excitation at different wavelengths, a problem in multi-laser systems, is avoided. Pulse timing problems created by the extremely short lifetimes of atoms of the isotopes in the excited states are avoided and much greater use is made of atoms of the isotopes in the metastable states having lifetimes approximately 5 orders of magnitude greater than atoms of those isotopes in the excited state only. Also the problem of small photo-ionization cross-sections, a problem for conventional photo/ionization methods, is avoided.

I claim:

1. The method of separating selected atoms which absorb radiation of one frequency from other atoms which absorb radiation of different frequencies comprising:
   (a) heating a mass of material containing both types of said atoms until a vapor of said material is formed;
   (b) irradiating said vapor with a laser source operating at said one frequency whereby said selected atoms are pumped into excited metastable states above the ground state of said selected atoms;
   (c) supplying a continuous source of thermal energy to said selected atoms in said excited metastable states forming an ionized plasma of said selected atoms; and
   (d) separating said ionized plasma from all said other atoms.

2. The method of claim 1 wherein said laser source is a pulsed laser.

3. The method of claim 1 wherein said laser source is a continuous laser.

4. The method of claim 1 wherein said continuous source of thermal energy is a heating grid.

5. The method of claim 1 wherein said continuous source of thermal energy is a heated neutral gas.

6. The method of claim 1 wherein said continuous source of thermal energy is an electron beam.

7. The method of claim 1 wherein said continuous source of thermal energy is a hot metal surface.

8. The method of claim 1 wherein said separating includes applying external electromagnetic forces to said ionized plasma.

9. Apparatus for separating selected atoms which absorb radiation of one frequency from other atoms which absorb radiation of different frequencies comprising:
   (a) a housing;
   (b) an oven having an outlet to said housing for heating a mass of material containing both types of said atoms until a vapor of said material is formed;
   (c) means for directing said vapor into said housing connected between said oven and said housing;
   (d) means for pumping said selected atoms in said vapor into excited metastable states above the ground state of said selected atoms;
   (e) means for continuously ionizing said selected atoms in said excited states by a continuous thermal energy source whereby an ionized plasma of said selected atoms is formed; and
   (f) means for separating said ionized plasma of said selected atoms from said other atoms.

10. The apparatus of claim 9 wherein said housing includes a vacuum vessel.

11. The apparatus of claim 9 wherein said exciting means is a tunable continuous laser.

12. The apparatus of claim 9 wherein said exciting means is a tunable pulsed laser.

13. The apparatus of claim 9 wherein said ionizing means is a heating grid.

14. The apparatus of claim 9 wherein said ionizing means is a heated neutral gas.

15. The apparatus of claim 9 wherein said ionizing means is an electron beam.

16. The apparatus of claim 9 wherein said ionizing means is a hot metal surface.

17. The apparatus of claim 9 wherein said separating means is an externally applied electromagnetic field.

* * * * *